United States Patent [19]
Freedman

[11] Patent Number: 4,925,714
[45] Date of Patent: May 15, 1990

[54] COEXTRUDED CORE LAMINATES

[75] Inventor: Melvin S. Freedman, Beachwood, Ohio

[73] Assignee: Avery International Corporation, Pasadena, Calif.

[21] Appl. No.: 325,664

[22] Filed: Mar. 20, 1989

Related U.S. Application Data

[60] Division of Ser. No. 61,000, Jun. 9, 1987, Pat. No. 4,837,088, which is a continuation of Ser. No. 699,205, Feb. 5, 1985, abandoned.

[51] Int. Cl.⁵ .............................................. B32B 7/06
[52] U.S. Cl. .............................. 428/40; 428/41; 428/352; 428/914; 428/411.1; 428/212
[58] Field of Search .................... 428/40–43, 428/343, 352, 212, 914, 411.1

[56] References Cited

U.S. PATENT DOCUMENTS

| | | | |
|---|---|---|---|
| 4,090,464 | 5/1978 | Bishopp et al. | 428/46 |
| 4,310,137 | 1/1982 | Frye | 428/40 |
| 4,398,985 | 8/1983 | Eagon | 428/212 |
| 4,446,183 | 5/1984 | Savagian | 428/42 |
| 4,521,267 | 6/1985 | Jacobson | 428/42 |
| 4,544,590 | 10/1985 | Egan | 428/40 |

*Primary Examiner*—James Seidleck
*Attorney, Agent, or Firm*—Pearne, Gordon, McCoy & Granger

[57] ABSTRACT

Multilayer laminates are made by extruding two polymeric films of different composition and forming them in contact with each other to provide a peelable interface, and forming a divisible core structure by permanently combining one of said films with a layer of pressure sensitive adhesive and combining the other film with at least one additional layer. The invention is useful for providing "dry" or non-tacky peelable labels and for providing renewable surfaces on articles such as trays or other substrates.

2 Claims, 2 Drawing Sheets

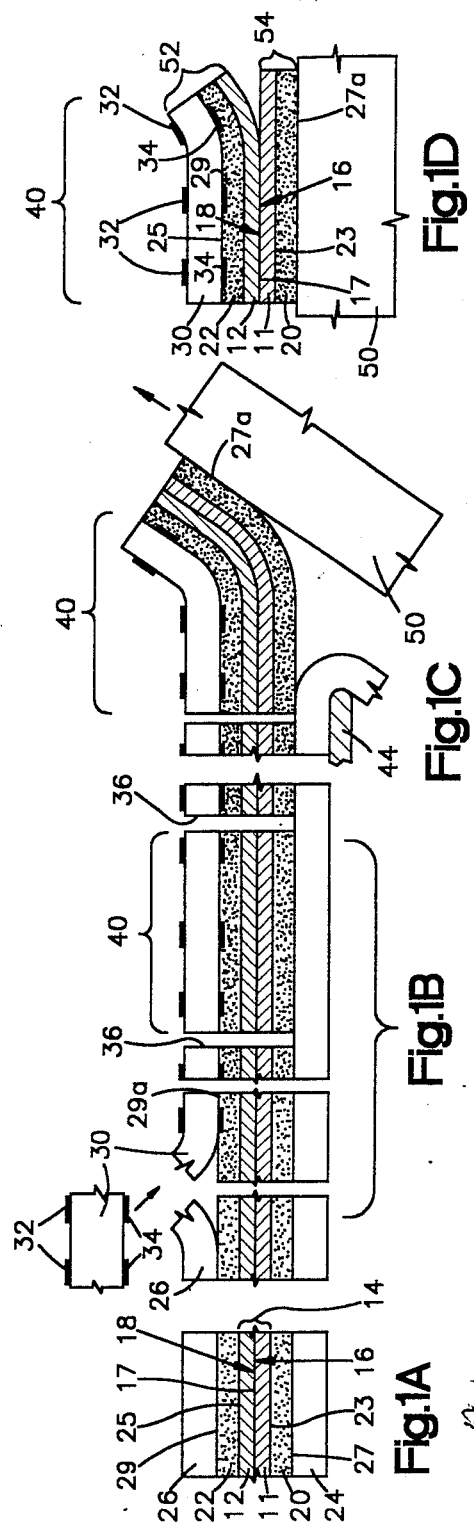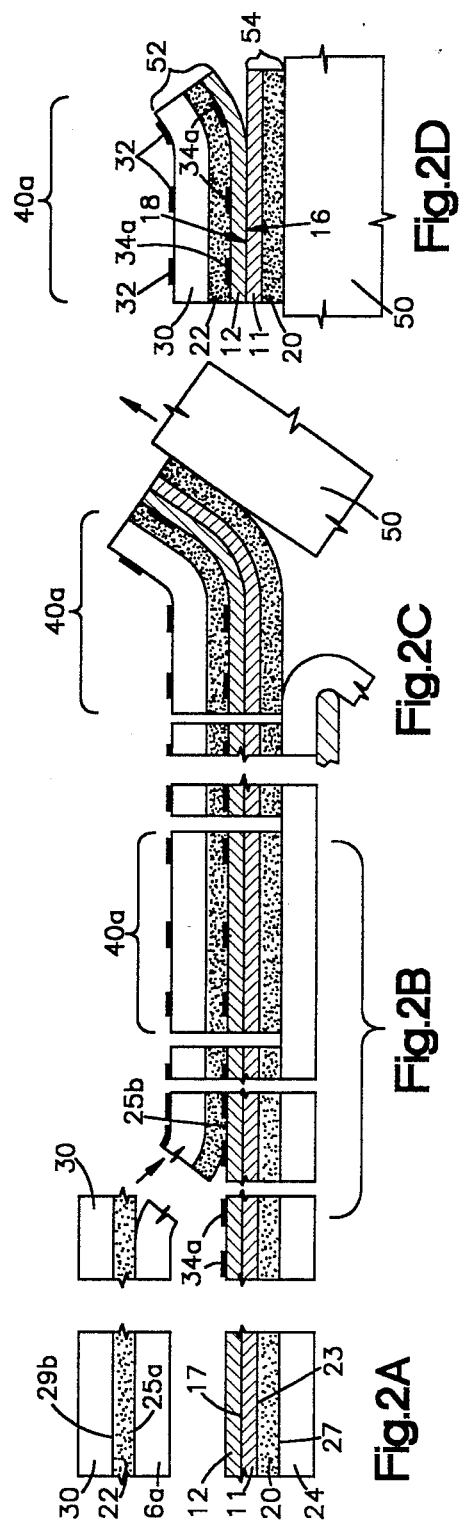

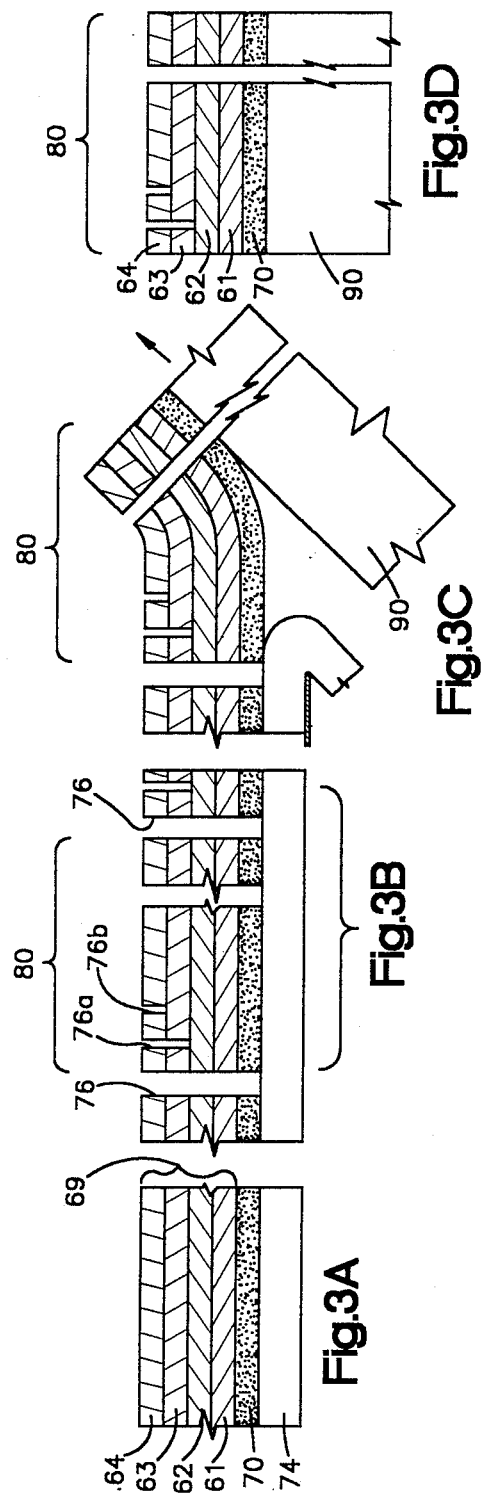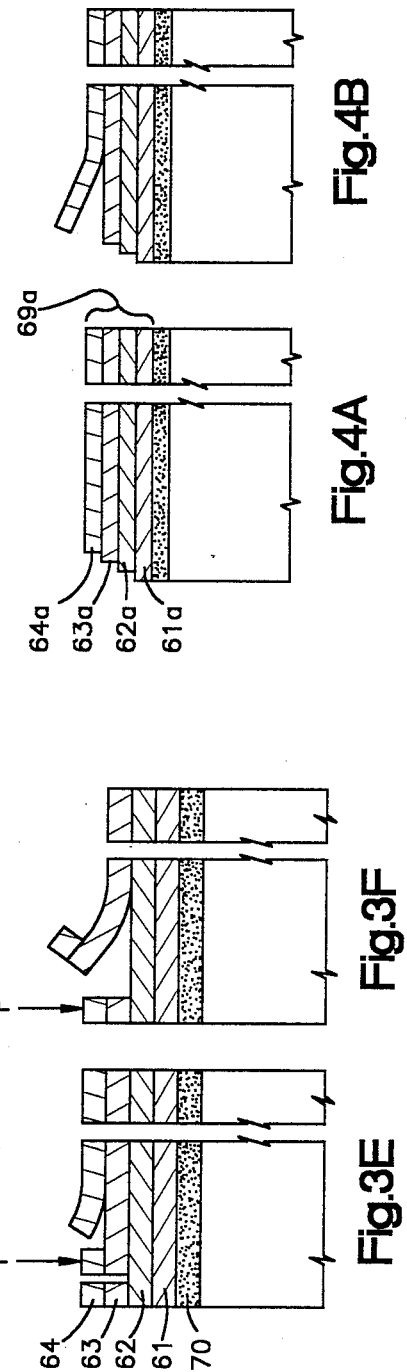

COEXTRUDED CORE LAMINATES

This application is a division of application Ser. No. 061,000, filed June 9, 1987, U.S. Pat. No. 4,837,088, which in turn is a continuation of application Ser. No. 699,205, filed Feb. 5,1985, now abandoned.

The present invention relates to a method and means for using pressure sensitive adhesive label technology to adhesively mount coupons, cards, tags or other similar cut-to-shape face pieces on containers, wrappings, packages, direct mailing materials and other substrates for pick-off by the consumer or end user, but in such a way that the face piece comes off the substrate "dry", leaving no sticky area either on the bottom of the face piece or on the top of the substrate.

The invention also relates to a method and means for using pressure sensitive adhesive laminating technology for the provision of "renewable surfaces" on trays or other products.

BACKGROUND OF THE INVENTION

Prior attempts to utilize pressure sensitive technology to adhesively mount face pieces for pick-off have generally resulted in a "wet" or sticky surface being exposed upon pick-off. Varying release characteristics have also been a problem where silicone-based release coatings have been applied to porous face materials, due to the difficulty of achieving uniformity of the silicone-based coatings. Also it is difficult to print on silicone-based coatings, so that printing of the underside of the face piece cannot be satisfactorily accomplished.

One prior art proposal for solution of the foregoing problems is found in Eagon U.S. Pat. No. 4,398,985 which provides "dry" pick-off and avoids reliance on a silicone-based coating for the pick-off release. However, such prior art proposal relies on relatively costly polymer coating steps, and requires custom label manufacture in association with the packaging or labelling operation. Such prior art proposall does not lend itself to established procedures in the packaging industry whereby pressure-sensitive adhesive labels are commonly applied to packages after being converted from label face stock and pressure sensitive stock into a series of temporarily supported labels by laminating, die cutting and then stripping the resulting matrix of waste material. These procedures are widely accepted and the conversion equipment to practice them is already widely possessed and used by "converters" or label manufacturers. In these procedures, the liner-supported labels produced by such a converter can be printed or decorated, in closely controlled proper registration with the die cuts, and can then be used by packagers (customers of the converters) on high speed automatic labelling machines to dispense and apply individual labels to individual packages, in a manner widely practiced in the industry.

As to the "renewable surface" aspect of the invention, it is known to coextrude a plurality of films which are combined into multilayer casings and the like. However, it is not believed that anyone has previously thought of exploiting the peelability potential of coextruded films to provide renewable surfaces for manufactured products such as paint pans or medical trays, let alone conceiving how to make such exploitation feasible for manufacturers of such products, who lack expertise and equipment necessary for coextruding films and for applying coextruded films to their products.

BRIEF DESCRIPTION OF THE INVENTION

The present invention not only provides "dry" pick-off and avoids reliance on a silicone-based coating for pick-off release, but also avoids relatively costly polymer coating steps. Moreover, the invention is fully compatible with standard procedures in the manufacture and use of pressure sensitive adhesive labels. Accordingly, the invention makes it possible for converters or label manufacturers to supply "dry" pick-off labels, tags, coupons or cards to packagers, direct mailers, or the like, and avoids any need for custom label manufacture in association with a packaging or direct mailing operation.

This aspect of the invention is characterized by the forming of a divisible core which includes a pair of coextruded unlike polymer films having a peelable interface, a layer of pressure sensitive adhesive permanently combined with one of the films, and at least one additional layer associated with the other of the films.

As to the "renewable surface" aspect, the invention provides manufacturers of trays or other products with a practical means of manufacturing products having renewable surfaces. This aspect of the invention involves forming multiple, peelable coextruded polymer films, each film being unlike any neighboring film, with a layer of adhesive permanently combined with the inner-most film to provide a multiple layer transfer which is then readily utilized to finish or cover one or more faces of the manufactured product and thereby form a renewable surface at such face or faces.

This aspect of the invention is again characterized by a pair of coextruded unlike polymer films having a peelable interface, a layer of pressure sensitive adhesive permanently combined with one of the films, and at least one additional layer associated with the other of the films. However, in these instances such additional layer or layers also comprise coextruded polymer films.

BRIEF DESCRIPTION OF THE DRAWINGS

In the drawings, which are not to scale and in which thicknesses are greatly exaggerated, FIGS. 1A through 1D are schematic cross-sectional drawings illustrating one sequence in the practice of the invention in providing dry pick-off face pieces.

FIGS. 2A through 2D are similar drawings illustrating a slightly different sequence.

FIGS. 3A through 3F are schematic drawings illustrating one sequence in the practice of the invention in providing "renewable surfaces".

FIGS. 4A and 4B illustrate a variant in the provision of renewable surfaces according to the invention.

DETAILED DESCRIPTION

Referring first to the embodiment of FIGS. 1A through 1D, two polymeric films 11 and 12 of different composition are formed in contact with each other to provide a coextrusion 14. The coextrusion 14 has a pair of contacting inner faces 16 and 18 constituting a peelable interface 17. The films 11 and 12 may be coextruded and formed in contact with each other by known coextrusion techniques, for example using multimanifold dies, as illustrated in U.S. Pat. Nos. 4,197,069 and 4,152,387. The interfacial peel strength at interface 17 is a function of several parameters, including, among others, the identities of the two dissimilar thermoplastic layers, the presence and types of additives in one or both of the coextruded films, the presence or absence of pigments in one or both films, the pressure exerted by, and the temperature of, the nip rollers, and thermal aging of the coextruded core. While several factors can play a role in providing a desired peel strength, that desired peel strength can be achieved through routine experimentation. Peel strengths of less than about 50 newtons/meter are effective for purposes of the present invention. Peel strengths in the range of 10 to 30 newtons/meter are preferred, and most desirable are interfacial peel strengths in the range of 10 to 20 newtons/meter.

As seen in FIG. 1A, the film 11 of the coextrusion 14 is combined with a layer of pressure sensitive adhesive 20 and the other film 12 of the coextrusion 14 is combined with the layer of pressure sensitive adhesive 22. In the embodiment of FIGS. 1A through 1D, both these combinations are permanent, but in any event, according to the broader aspects of the invention, at least one of the films of the coextrusion is permanently combined with a pressure sensitive adhesive, and the other film is combined with at least one additional layer. In this example, when combined with the coextrusion 14, the adhesive layers 20 and 22 are provided with release liners 24 and 26 which may be conventional silicone coated release papers. The combining step may comprise simply laminating the liner supported adhesives 20 and 22 on opposite sides of the coextrusion 14.

The interfacial peel strength at interface 23 between film 11 and adhesive 20 is substantially greater than the peel strength at interface 17. The interfacial peel strength at interface 25 between film 12 and adhesive 22 is also substantially greater than the peel strength at interface 17. The peel strengths at the interfaces 27 and 29 are lower than the peel strength at interface 17, interface 27 being between adhesive 20 and release liner 24, and interface 29 being between adhesive 22 and release liner 26a.

The steps as so far described may be performed by a manufacturer of label stock who is able to manufacture rolls of label stock from which labels are formed more economically than possible for a "converter" or label manufacturer because of the former's specialization in coating, web treating, and adhesive compounding, and the economies of scale in centralizing the manufacture of label stock to be used by a number of label manufacturers.

The product as shown in FIG. 1A may be wound into roll form and shipped to a label manufacturer. The steps illustrated in FIG. 1B may be performed by the label manufacturer using conventional label manufacturing equipment and techniques, but using them in a special way. Thus, after the stock is unwound, the liner 26 is removed as shown, and face stock 30 is permanently laminated to the adhesive 22. The peel strength at the new interface 29a substantially exceeds that at interface 17.

The face stock 30 may be paper or a polymeric film material, printed or decorated with indicia 32 on its top side and indicia 34 on its bottom side. If the face stock 30 is transparent, the indicia 34 may be reverse printed or decorated on the bottom side for viewing from the top. Or, the face stock may be printed on both sides, as shown, the adhesive 22 and film 12 each being transparent so that the indicia 34 may be seen from the underside following separation of the films 11 and 12, as described below. The stock 30 may be a sublaminate. The upper surface may be printed or decorated after assembly is completed, but preferably one or both surfaces are preprinted as shown. Importantly, the face stock may be any suitable conventional face stock material from any source. Printing or decoration may be accomplished in a single pass on an ordinary rotary press. No coating steps are required to be performed by the label manufacturer or by anyone subsequent to him in the practice of the invention.

Following the laminating of the face stock to the adhesive 22, the label manufacturer may die cut the construction into individual labels, such as the label 40, successive labels being separated by cuts 36 which extend from the top of the construction to but not through the liner 24. Of course, the indicia 32 are maintained in proper register with the label outlines or edges in accordance with conventional label printing and cutting techniques. The construction now consists of a succession of labels identical to the label 40, all supported on the liner 24. This construction may be wound into roll form and shipped to a labeller such as a manufacturer of canned, bottled or boxed products, or mailer of credit cards or advertising materials bearing labels in the form of coupons or the like.

As illustrated in FIG. 1C, the labeller may apply the labels using conventional label applying techniques, but again, using them in a special way. Thus, the roll of labels received from the label manufacturer may be unwound and fed past a peelback edge 44, and the labelling equipment used by the labeller may pull the liner 24 back around the peelback edge to advance each individual label, such as the label 40, into progressive adhesive contact allowed by its substantial flexibility shown in FIG. 1C, with a passing substrate 50 such as a can, bottle, box, letter, advertising mailer, or the like. In this step the adhesive 20 is permanently joined to the substrate 50 at interface 27a whose peel strength substantially exceeds that at interface 17.

The result is a series of labelled items which are subsequently distributed directly or indirectly from the labeller to end users, such as consumers of the packaged products or recipients of the credit cards or advertising materials, and each of which labelled items includes within the label the coextrusion 14 and interface 17, as seen in FIG. 1D.

The end user can then remove the outer part 52 of the label, which may constitute a returnable label, coupon, or a credit card, leaving the lower part 54 permanently mounted on the substrate 50. Removal is accomplished simply by pulling back the top part 52. Since adhesive 20 is permanently joined to the film 11 and to the substrate 50, and adhesive 22 is permanently joined to the film 12 and face stock 30, separation occurs at the interface 17. Since adhesives 20 and 22 remain covered respectively by films 11 and 12, both the top and bottom parts 52 and 54 of the separated labels remain "dry" and tack-free.

It is to be noted that the practice of the invention as described does not require custom label manufacture in association with each packaging or labelling operation, and is fully compatible with procedures which are presently in general use in converting label stock into labels and in applying labels to containers and other substrates.

FIGS. 2A through 2D illustrate a variant of the invention in which the combining of the polymeric film 12 with additional layers on its side of the construction may be accomplished by the label manufacturer after receiving the precoated face stock from a label stock manufacturer. In this variant, the coextruded core 14 is formed and combined with the adhesive layer 20 and release liner 24 as shown in FIG. 2A. The relative peel strengths at the interfaces 17, 23, and 27 are as previously described. The other adhesive layer 22 along with the face stock 30 and a release liner 26a may be separately supplied. The peel strength at interface 29b between face stock 30 and adhesive 22 substantially exceeds that at interface 17, while the peel strength at interface 25a is less than that at interface 29b. The label manufacturer strips the liner 26a and laminates the adhesive 22 along with the face stock 30 to the polymeric film 12. The indicia 32 may be preprinted on the face stock prior to this operation. Printing on the underside, if employed, is performed prior to the laminating step by printing the film 12 with indicia 34a, as shown in FIG. 2B. In this case the adhesive 22 as well as the face stock 26 is transparent if the indicia 34a are to be reverse printed and viewed from the top of the resulting label. Or, the film 12 is transparent if the indicia 34a are to be viewed from the bottom. The peel strength at interface 25b substantially exceeds that at interface 17.

The remainder of the steps in FIGS. 2A through 2D produce a series of labels exemplified by label 40a. These steps may correspond to those of FIGS. 1A through 1D, and will be self-evident from the drawings in light of the prior description of the sequence of FIGS. 1A through 1D.

The coextruded core 14 is at the center and heart of the multilayer assemblies of the present invention as so far described. It is this core which permits the production of the tack-free faces for the labels and substrates without leaving behind any residue and without requiring special coatings or coating steps. It is this core which provides peel strengths which are sufficiently different from those of the release liners as is necessary for the effective use of pressure-sensitive adhesives in the assemblages and in the formation of the assemblages, as well as making possible easy and effective manufacture of the multilayer assemblages of this invention.

Thus, the interior faces provide the interface 17 having a first interfacial peel strength which is substantially greater than adhesive-release liner interfacial peel strengths and substantially less than adhesive-core and adhesive-substrate or adhesive-label interfacial peel strengths, the latter being permanent bonds.

Suitable polymer extrudate compositions for the films 11 and 12 include polyethylene and polypropylene, but other compositions may be used. Similarly, substrates and stock other than those specifically referred to may be used. Many end products such as plastic or paper labels, credit cards, coupons, tags and the like may beneficially be incorporated in multilayer laminates with the pressure-sensitive adhesives and coextruded cores used to prepare the assemblages. Substrates may comprise letter weight paper stock, plastic or plastic coated stock, paper board stock, containers or other objects or multilayer laminates.

The pressure-sensitive adhesive used for the adhesive may be a hot-melt material that can be rubber or acrylic based. Preferred adhesives exhibit an adhesive force of about 15 to about 50 ounces per inch (about 170 to about 560 grams per centimeter) of adhesive width in the 180° peel adhesive test of the P.S.T.C. test #1, with a 20 minute dwell time. More preferably, the adhesive force is about 20 to about 45 ounces per inch (about 220 to about 450 grams per centimeter).

The adhesive force of a given adhesive can also be altered to provide the desired adhesion by the inclusion of commercially available modifiers. Exemplary modifiers include the acrylic resin sold under the trademarks ACRYLOID B-67 by Rohm and Haas, PICCOTEX LC modifying resin sold by Hercules, Inc. and TRITON X-15 (ethylene glycol octyl phenyl ether) sold by Rohm and Haas.

Useful acrylic pressure-sensitive adhesives are typically relatively low molecular weight copolymers as are made by bulk polymerization in the presence of chain terminating agents, as compared to the relatively high molecular weight copolymers prepared from the same monomers by emulsion polymerization techniques. Exemplary monomers useful in forming pressure-sensitive acrylic adhesives include but are not limited to acrylic and methacrylic acids, 2-ethylhexyl acrylate, butyl acrylate, methyl acrylate, methyl methacrylate, vinyl acetate, N-vinyl pyrolidone, 2-hydroxyethyl acrylate, and the like.

One particularly useful material is the acrylic-based polymer sold under the trademark Experimetal Resin QR-667 by Rohm and Haas. That material is reported by its manufacturer as being a clear solid having a glass transition temperature of $-40°$ C. and a melt viscosity of 350° F. and 25,000–35,000 centipoises at 10 revolutions per minute.

The pressure sensitive adhesives may be of any suitable type, including hot melt, emulsion, or solvent based types. Hot melts are presently preferred and examples include styrene-butediene-styrene and styrene-isoprene-styrene block copolymers that are combined with a hydrocarbon resin or resin ester as are disclosed in U.S. Pat. No. 4,080,348, to Korpman. Additional hot-melt pressure-sensitive adhesives are disclosed in U.S. Pat. Nos. 3,281,383; 3,519,585; 3,676,202; 3,723,170 and 3,787,531.

The renewable surface aspect of the invention is illustrated in FIGS. 3A through 3F. Another embodiment is illustrated in FIGS. 4A through 4B.

In FIG. 3A, four polymeric films 61, 62, 63 and 64 have been coextruded in contact with each other to provide a multi-ply coextrusion 69. The number of coextruded film layers may exceed four. Adjacent pairs of the films are related to each other similarly to the film pair 11, 12, so that the film pairs are joined at their common interfaces but are separable at those interfaces. This may be accomplished for example by using films of different compositions for each adjacent pair of films, although a given composition may be repeated for non-adjacent films. Desirably, the further toward the outer or upper portion of the construction a given interface is, the easier should be its peelability. However, such progressive peelability is not always critical to practice of the invention as will become clear below.

As seen in FIG. 3A, the film 61 is combined with a pressure sensitive adhesive layer 70 provided with a release liner 74. The film 62 is, as part of the coextrusion process, combined with an additional layer, namely the film 63, rather than being combined with an adhesive layer as in prior embodiments.

The construction shown in FIG. 3A may be applied to substrates such as sterile surfaces (e.g. medical trays), glass screens of cathode ray terminals (CRTs) (e.g. in applications where the screens are subject to abrasion by light pens), paint pans, lapboards, wall or counter surfaces or other substrates where "renewability" is desired, by simply removing the liner 74 and pressing the adhesive side of the construction against the substrate. The techniques of label manufacturer and application may be employed for mass produced items, as illustrated in FIGS. 3B through 3D. Thus, the construction may be cut into a series of individual "labels" or pieces, such as the piece 80, of dimensions desired for covering the tray or other substrate workpiece. The piece 80 is defined by die cuts 76, which are analagous to the die cuts 36 of the embodiments previously described. The series of pieces exemplified by the piece 80 may be applied to the substrate or workpiece 90 by label applying techniques as illustrated in FIG. 3C, resulting in a substrate with a renewable top surface as seen in FIG. 3D. To renew the surface, the user simply peels off the top layer 64. To aid in implementing the peel at the desired interface, supplementary die cuts 76a and 76b may be provided at the stage illustrated in FIG. 3B. Cut 76a extends through films 64 and 63, but not 62. Cut 76b extends through film 64 only. As the user starts to peel back the main portion of top layer as seen in FIG. 3E, he or she maintains finger pressure as indicated by arrow F, thus holding down the ends of films 63 and 62. After peeling progresses a short way, the peelback angle will approach 180 degrees, or at least will exceed 90 degrees, rather than being very shallow as shown in the drawings. Thereafter the tendency to peel at the desired interface will exceed the tendency to peel at lower interfaces even if respective peel strengths are comparable, and finger pressure at F may be removed as peeling continues.

Similarly, when the surface is again to be renewed by peeling off the layer 63, finger pressure is maintained at new point F as shown in FIG. 3F during the start of peelback. Again, as peelback continues, this finger pressure may be released and the tendency to peel at the desired interface will exceed the tendency to peel at a lower interface.

When the final renewal is accomplished by peeling off the layer 62, layer 61 remains permanently bonded to adhesive 70 so that in any event peeling of layer 62 may be started and continued without any holding down of the end of layer 61.

If more than four layers of coextruded film are provided, progressively shallower cuts similar to cuts 76a and 76b may be provided in greater number than those shown, with the deepest points of the cuts being just above progressively higher films.

FIGS. 4A and 4B illustrate a variant in which films 61a, 62a, 63a and 64a are formed as coextrusion 69a with the films die cut or otherwise formed in stepwise fashion at the end at which peelback is to start, as shown in the drawings. As the peeling of a then topmost film is begun in order to renew the surface, the edge of the then next-to-top film may be constrained with a fingernail or thin tool (not shown) until peeling is well underway and the peelback angle has advanced well past the shallow angle seen in FIG. 4B and even well past 90 degrees. Once again, the tendency to peel at the desired interface will exceed the tendency to peel at other interfaces even if respective peel strengths are comparable.

As stated earlier, although not essential, it is preferable that peelability of the coextruded layers be progressive, so that the further toward the outer or upper portion of the construction an interface is located, the easier its peelability. Such progressively varying peelability can be achieved by progressively varying the peel strength parameters noted earlier to the extent they may be selectively associated with the formation of film interfaces at progressively higher locations in the coextrusion. For example, progressively varying proportions of additive may be introduced to the melts associated with the formation of progressively higher film interfaces. If two or more basic film compositions are alternated in a repeating pattern to constitute the coextrusion, such as the repeated alternation of polyethylene and polypropylene, the progressive proportionings of additives for each series of films of a given material may be maintained for that series.

Reference herein to polymeric films of different composition will be understood to refer generally to coextruded films of sufficiently different nature that the coextruded films, once formed, can be peelably separated. The invention contemplates that this may be accomplished with selective use of modifiers or additives or by other means, even for coextruded films whose compositions are closely related chemically.

It will be understood that adhesives whose peel strength is so high with respect to films, papers or other layers of material with which they are used as to form essentially a permanent bond are referred to herein as permanent adhesives, or as adhesives that permanently bond to a layer or layers. The peel strengths involved between an adhesive and a layer to which it bonds permanently will usually be so high as to positively prevent separation without virtual destruction of the layers involved.

It should be evident that this disclosure is by way of example and that various changes may be made by adding, modifying or eliminating details without departing from the fair scope of the teaching contained in this disclosure. The invention is therefore not limited to particular details of this disclosure except to the extent that the following claims are necessarily so limited.

What is claimed is:

1. A multilayer flexible label assembly providing a pair of tack-free peelingly separable subassemblies comprising:

a flexible central core formed by a coextrusion process, said central core comprising a first polymeric film and a second polymeric film, said films being different in composition, each having an interior face formed during the coextrusion process by contact with the other, the interior faces mutually providing an interface between them which is devoid of interposed coatings, said interior faces forming a first peelable interface having a given interfacial peel strength, each said polymeric layer having an exterior face, a layer of pressure-sensitive adhesive secured to an exterior face of one of said polymeric films, a flexible release liner adhered by said pressure-sensitive adhesive to said exterior face to form a multilayer assembly, the interfacial peel strength between said adhesive layer and said exterior face being substantially greater than said interfacial peel strength at said first peelable interface and the interfacial peel strength between said adhesive and said release liner being substantially less than said interfacial peel strength at said first peelable interface, a second layer of pressure-sensitive adhesive adhesively associated with the exterior face of the other polymeric film, and an additional flexible layer adhesively secured by said second pressure-sensitive adhesive layer to the exterior face of said other polymeric film and providing an interfacial peel strength substantially greater than said interfacial peel strength at said first peelable interface, said label assembly being die cut-to-shape from the side of said additional layer to but not through said release liner.

2. A multilayer flexible label assembly providing a pair of tack-free peelingly separate subassemblies comprising:

a flexible central core formed by a coextrusion process, said central core comprising a first polymeric film and a second polymeric film, said films being different in composition, each having an interior face formed during the coextrusion process by contact with the other, the interior faces mutually providing an interface between them which is devoid of interposed coatings, said interior faces forming a first peelable interface having a given interfacial peel strength, each said polymeric layer having an exterior face, a first layer of pressure-sensitive adhesive secured to an exterior face of one of said polymeric films, a substrate layer permanently adhered by said pressure-sensitive adhesive to said exterior face to form a multilayer assembly, the interfacial peel strength between said first adhesive layer and said exterior face being substantially greater than said interfacial peel strength at said first peelable interface and the interfacial peel strength between said first adhesive layer and said substrate layer being substantially greater than said interfacial peel strength at said first peelable interface, a second layer of pressure sensitive adhesive secured to the exterior face of the other of said polymeric films, and an additional flexible layer adhesively secured by said second pressure-sensitive adhesive layer to said exterior face of said other film to provide an interfacial peel strength substantially greater than said interfacial peel strength at said first peelable interface, said flexible lable assembly being die cut-to-shape from the side of said additional layer to but not through said substrate whereby when said layers are peelingly separated, they separate along said first interface and said first and second layers of adhesive remain in sandwiched array, respectively, between said substrate and said one thermoplastic film, and between said additional layer and said other thermoplastic film to form two multilayer subassemblies.

* * * * *